(12) United States Patent
Barger

(10) Patent No.: US 8,162,071 B2
(45) Date of Patent: Apr. 24, 2012

(54) SOIL AERATOR

(76) Inventor: K. Kent Barger, Louisville, KY (US)

( * ) Notice: Subject to any disclaimer, the term of this patent is extended or adjusted under 35 U.S.C. 154(b) by 25 days.

(21) Appl. No.: 12/584,890

(22) Filed: Sep. 14, 2009

(65) Prior Publication Data

US 2011/0061881 A1 Mar. 17, 2011

(51) Int. Cl.
*A01B 45/02* (2006.01)
(52) U.S. Cl. .............................. 172/21; 172/49; 172/120
(58) Field of Classification Search ................ 172/21, 172/22, 49, 65, 120, 426, 430; 37/906
See application file for complete search history.

(56) References Cited

U.S. PATENT DOCUMENTS

| | | | | |
|---|---|---|---|---|
| 223,336 A * | 1/1880 | Gibson | ........................ | 172/548 |
| 381,464 A * | 4/1888 | Crane | ............................. | 172/69 |
| 415,813 A * | 11/1889 | Fox | ................................. | 172/49 |
| 1,239,294 A * | 9/1917 | Nilsen | ............................. | 172/48 |
| 1,240,542 A * | 9/1917 | Cassell | ........................... | 172/49 |
| 1,389,512 A * | 8/1921 | Juopperi | ........................ | 172/49 |
| 1,397,428 A * | 11/1921 | Kerr | ................................ | 172/554 |
| 1,641,393 A * | 9/1927 | Mackie | ........................... | 172/69 |
| 1,807,182 A * | 5/1931 | Stoner | ............................ | 172/21 |
| 2,755,721 A * | 7/1956 | Rusconi | ........................... | 172/4 |
| 2,948,345 A * | 8/1960 | Brewster | ........................ | 172/49 |
| 3,339,643 A * | 9/1967 | Scarborough | ................ | 172/184 |
| 3,397,748 A * | 8/1968 | Whitesides | ................... | 172/548 |
| 3,611,956 A * | 10/1971 | Moore et al. | ..................... | 111/62 |
| 3,773,112 A * | 11/1973 | Zinck | .............................. | 172/42 |
| 4,202,414 A * | 5/1980 | vom Braucke et al. | ......... | 172/42 |
| 4,492,273 A * | 1/1985 | Fox | ................................. | 172/520 |
| 4,496,005 A * | 1/1985 | Swartzendruber | ............ | 172/395 |
| 6,148,928 A * | 11/2000 | Spears | ........................... | 172/439 |
| 6,904,979 B1 * | 6/2005 | Confoey | ..................... | 172/799.5 |
| 2008/0053671 A1* | 3/2008 | Buckrell et al. | ................. | 172/21 |

FOREIGN PATENT DOCUMENTS

FR 2703878 A1 * 10/1994

* cited by examiner

*Primary Examiner* — Robert Pezzuto
*Assistant Examiner* — Jamie L McGowan
(74) *Attorney, Agent, or Firm* — Carrithers Law Office PLLC

(57) ABSTRACT

An implement that conditions the ground surface as it is moved there over aerating the soil and distributing fertilizer and/or seeds thereon. The implement has a pair of aerator rollers mounted on a frame that can be towed by a tractor or constructed so as to be self-propelled if so desired. The aerator rollers project below the frame for rolling engagement with the ground and are located one behind the other in tandem relation relative to the direction of travel of the implement during use thereof. Each aerator roller has a plurality of formations defining teeth that penetrate the ground surface. The formations on each aerator roller are spaced apart from one another circumferentially around and longitudinally along the roller associated therewith and such formations on one aerator roller are offset from those on the other roller permitting overlap of the same. The aerator rollers are interconnected in drive and driven relation to rotate in a predetermined ratio. A hopper mounted on the frame dispenses seeds, fertilizer or the like if so desired. A rear depth control roller assembly using one or more rollers or wheels is pivotally mounted on the frame and can be brought into rolling engagement with the ground to control the depth of penetration of the formations of the aerator rollers into the ground.

20 Claims, 5 Drawing Sheets

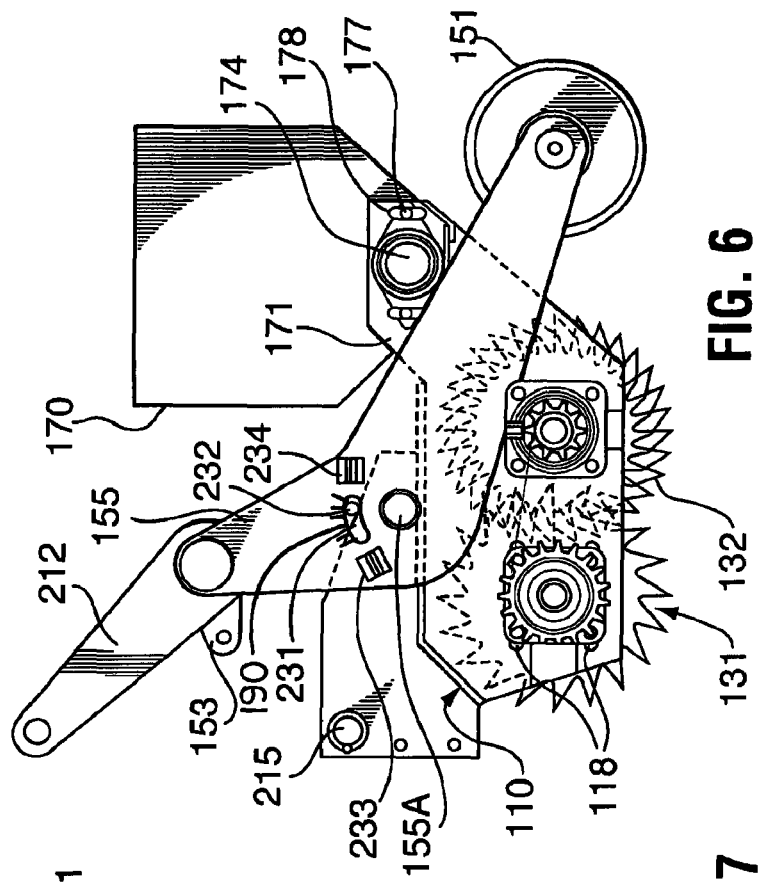
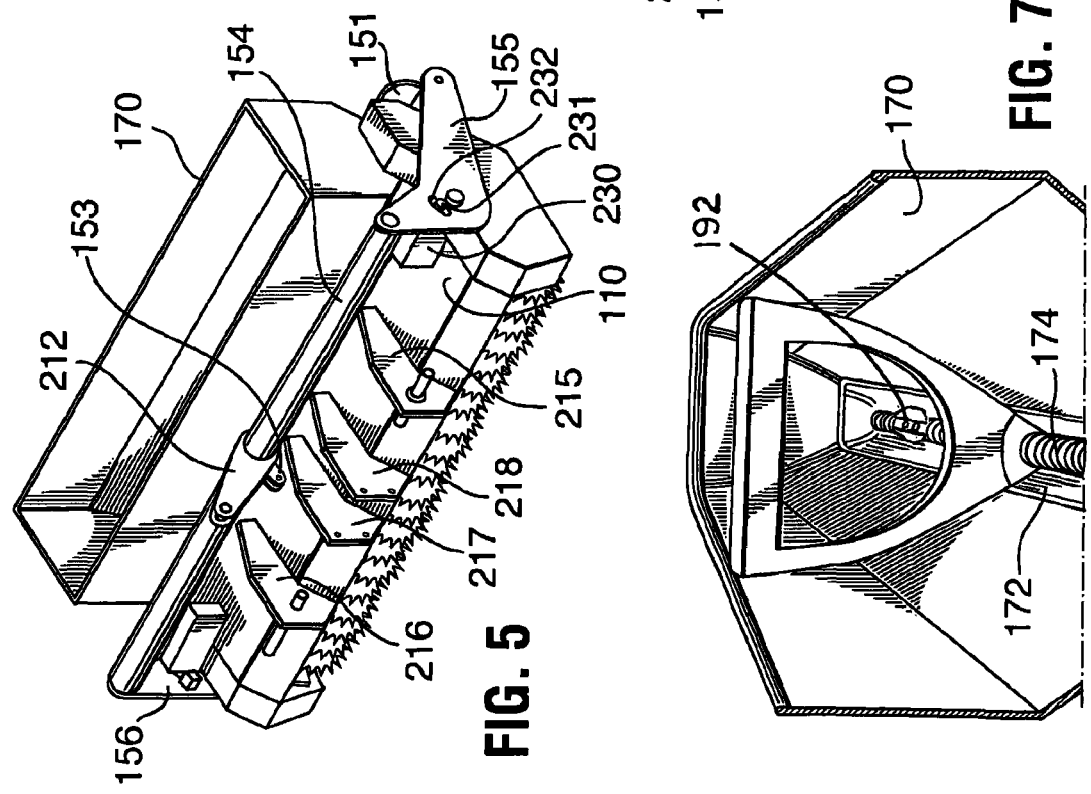
FIG. 5
FIG. 6
FIG. 7

SOIL AERATOR

FIELD OF INVENTION

This invention is directed to an implement for aerating soil and more particularly one which at the same time is capable of performing additional functions such as seeding and distribution of fertilizer.

BACKGROUND OF INVENTION

Compacted soil restricts the amount of oxygen that can enter the soil and the amount of carbon dioxide that can escape. Aeration reduces ground compaction increasing permeability of the soil and thereby stimulates plant growth.

Soil aerators are known one type of which removes plugs of soil and another type in which spikes penetrate the soil surface. Both are dedicated single function implements.

Not all soils are the same and therefore a single process function may not be applicable to all conditions. A machine that utilizes spikes may not provide adequate shear to break apart large solely aerates can be of very limited use. Also gardeners in addition to periodic aerating often at the same time follow this with scarify the soil or de-thatch a lawn and/or applying grass seed and/or granular feed and/or weed killer.

The instant invention provides an aerator utilizing a plurality of blades having teeth extending therefrom and is capable of performing de-thatching, seed application, fertilizer or lime application, weed killer applications as well as additional functions.

SUMMARY OF INVENTION

The present invention provides an implement for conditioning the surface of the ground while being moved thereover. The implement comprises a rigid frame assembly having a pair of aerator rollers journalled thereon for rolling engagement with the ground surface. The pair of aerator rollers are located one behind the other in tandem relation relative to the direction of travel of the implement during use thereof. Each aerator roller has a plurality of formations defining blades having teeth that penetrate the ground surface of the soil. The formations are disposed in selected spaced apart relation circumferentially around and longitudinally along the aerator roller associated therewith. Drive means interconnecting the aerator rollers provide interrelating rotation of the same in a predetermined ratio.

An object of the present invention is to provide a simple aerating implement.

A further object of the present invention is to provide a robust aerating implement.

A further and principal object of the present invention is to provide a multi-function aerating implement.

Another object of the present invention is to provide an aerator including a hopper for holding seeds or fertilizer for distribution of same.

Another object of the present invention is to provide an apparatus providing periodic aerating of the soil and optionally follow this with scarify the soil or de-thatch a lawn and/or applying grass seed and/or granular feed and/or weed killer.

It is another object of the present invention to overlap the front and rear blades of each roller providing a self cleaning action in wet or damp ground.

It is another object of the present invention to utilize a plurality of blades having cutting teeth as opposed to spikes.

Moreover, the aerator implement is provided that conditions the ground surface as it is moved there over aerating the soil and distributing fertilizer and/or seeds thereon. The implement consists essentially of a pair of aerator rollers mounted on a frame that can be towed by a tractor or constructed so as to be self-propelled if so desired. The aerator rollers project below the frame for rolling engagement with the ground and are located one behind the other in tandem relation relative to the direction of travel of the implement during use thereof. Each aerator roller has a plurality of formations defining teeth that penetrate the ground surface. The formations on each aerator roller are spaced apart from one another circumferentially around and longitudinally along the roller associated therewith and such formations on one aerator roller are offset from those on the other roller permitting overlap of the same. The aerator rollers are interconnected in drive and driven relation to rotate in a predetermined ratio. A hopper mounted on the frame dispenses seeds, fertilizer or the like if so desired. A rear depth control roller assembly using one or more rollers or wheels is pivotally mounted on the frame and can be brought into rolling engagement with the ground to control the depth of penetration of the formations of the aerator rollers into the ground.

Other objects, features and advantages of the invention will become apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 5 is a frontal oblique view, similar to FIG. 1, illustrating a second embodiment of applicants implement;

FIG. 6 is a left hand side view of the implement shown in FIG. 5;

FIG. 7 is an oblique top view of a portion of the hopper showing the interior thereof.

DETAILED DESCRIPTION OF PREFERRED EMBODIMENT

Figure 1:
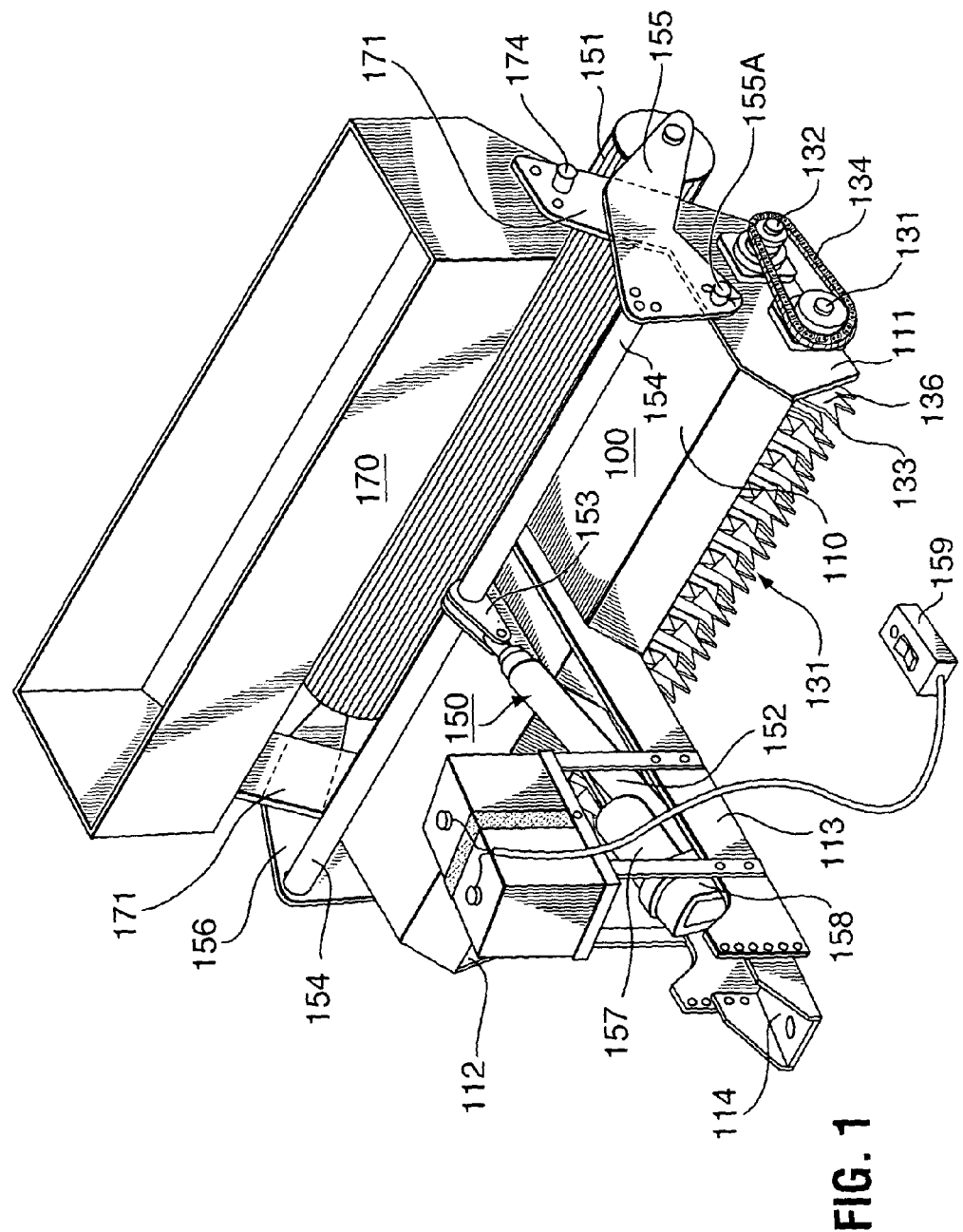
FIG. 1 is a frontal oblique view illustrating one embodiment of applicants implement.
Figure 2:
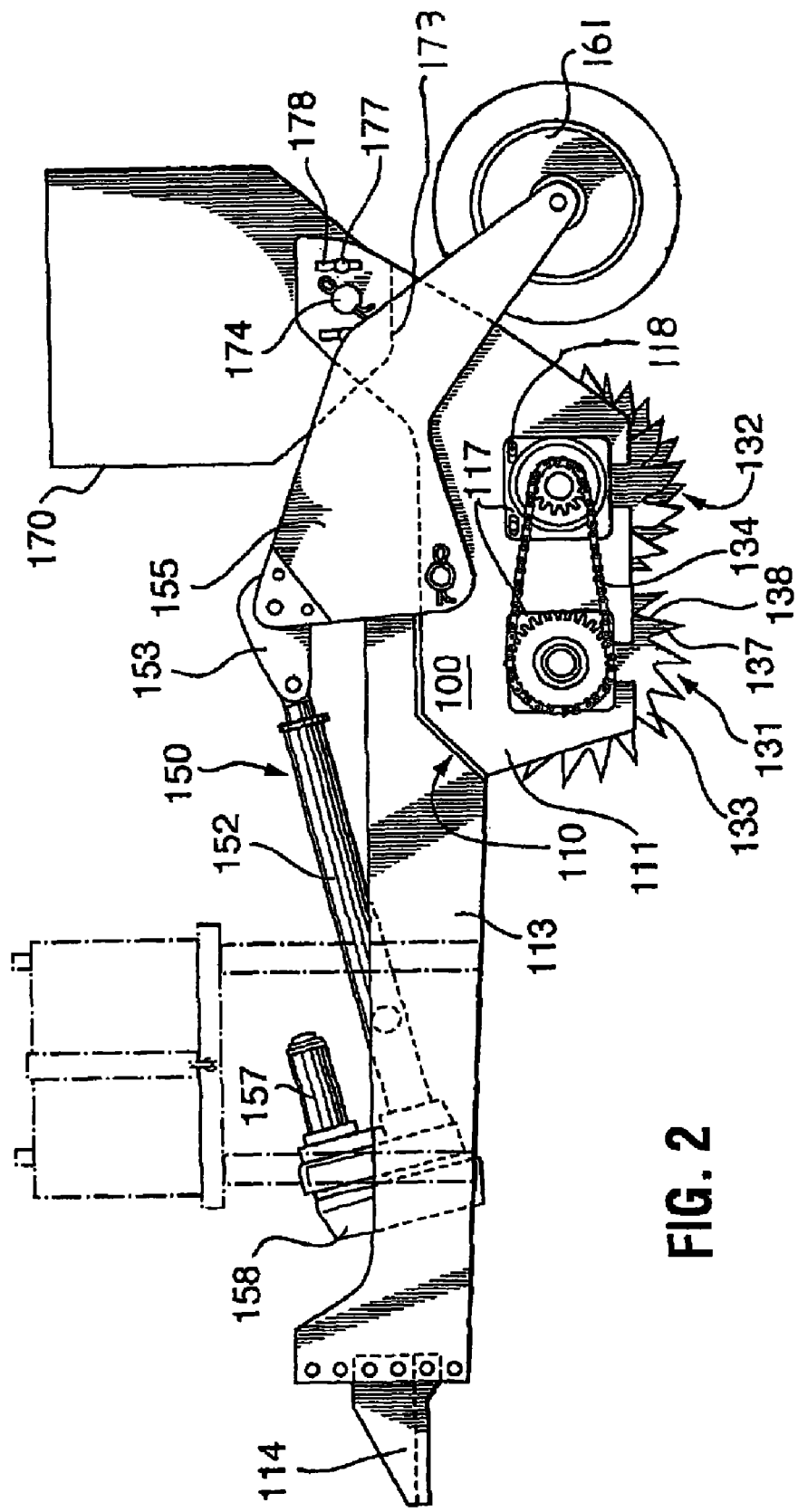
FIG. 2 is a side view showing the left side of the implement shown in FIG. 1.

Illustrated in the drawings is an aerator implement 10 that, in a single pass during operation, conditions the ground surface using an aerator roller assembly 130 and following that applies a treatment thereto if so desired. The ground conditioning includes a first step of aerating or pulverizing with aerator rollers 131 and a second step of de-thatching or scarifying with aerator roller 132. The implement is capable of performing a third step, following the ground conditioning, referred to herein as soil treatment that includes, as maybe desired, seeding and/or applying granular form fertilizer/lime and/or weed killer that is dispensed from a hopper 170 mounted on the implement. Trailing the treatment step is an adjustable depth control unit 151 that in the embodiment seen in FIG. 1 utilizes at least one roller serving as a reaction force point for a depth control system, optional ground compactor and/or a transport roller when used with the three point hitch version or pull version.

The ground conditioning portion of the aerator 10 comprises an aerator roller assembly 130 including a pair of horizontally spaced apart ground engaging aerator rollers 131, 132 mounted on a rigid frame assembly 100. The front aerator roller 131 drives the rear aerator roller 132. Each aerator roller has a plurality of spaced apart blades having teeth 133 projecting therefrom that penetrate a selected depth into the ground surface. These teeth, by way of example, maybe about 1.5" long and shaped so as to have a leading edge 137 radial to the axis of rotation of the aerator roller associated therewith and a trailing edge 138 disposed at an angle of about 30 degrees to the leading edge. One preferred example has a 45° rake angle and 30° relief angle. The teeth or protrusions 133 on the leading aerator roller puncture and cut grooves in the ground as the aerator roller is rolled over the surface thereof and the second or trailing aerator roller 132 is driven by aerator roller 131 via a chain 134 and sprockets to rotate preferably at a speed different from that of the first aerator roller 131 with the ratio of the front roller ranging varying with respect to the rear roller according to the soil conditions and desire of the user. The front roller is usually set to rotate faster than the rear roller. The teeth on the second aerator roller scarify the soil or de-thatch a lawn as the case maybe depending upon the state of the ground surface and speed of rotation thereof relative to the ground speed. In one preferred embodiment the rollers are 4 inches in diameter and the disc have an outside diameter of about 8 inches.

The preferred embodiment utilizes blades having teeth as opposed to spikes because the blades in order to obtain a higher ratio of interlocking of the blades than can be accomplished by spikes which provide a lower surface area for interlocking. Of course both the front aerator roller 131 and rear aerator roller 132 rotate in the same forward direction only at different speeds wherein the rear roller rotates at a faster speed than the front roller. Typical selected rates of rotation may be for example at a ratio of 1:3, 1:2, of a (1:1.4).

The rigid frame assembly 100 includes a downwardly facing concave housing 110 having pair of oppositely disposed end walls 111, 112 and means secured to the housing that is adapted to be connected to a hitch of a tractor, jeep, ATV, mower, horse, or other powered pulling device. The tractor attachment hitch means in one embodiment as best illustrated in FIGS. 1-4 is a forwardly projecting rigid elongate tow bar 113 that connects at its leading end 114 to a tractor draw bar (not shown). The depth of the aerator roller 132 can be adjusted by lifting the rear of the aerator with the rear roller which can be powered by a battery unit.

The implement towing vehicle maybe a tractor, ATV, or the like that pulls the implement over the area selected for treatment. It will be obvious to those skilled in the art that the implement could readily be made so as to be self-propelled, for example, by having a motor mounted thereon and drivingly connected, via a centrifugal clutch (or the like) and chain or V-belt drive train, to the leading aerator roller 131.

Figure 3:
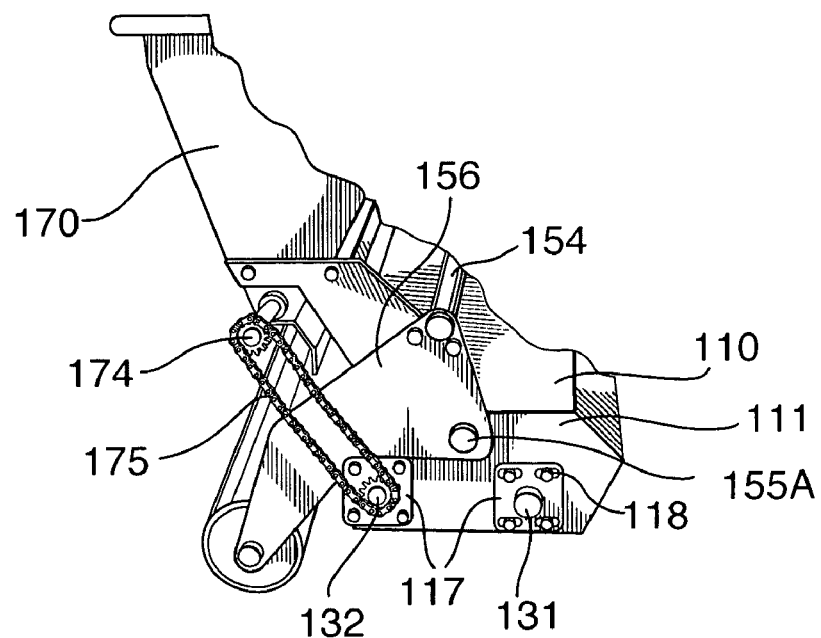
FIG. 3 is a frontal oblique view showing the right hand side portion of the implement shown in FIG. 1.
Figure 4:
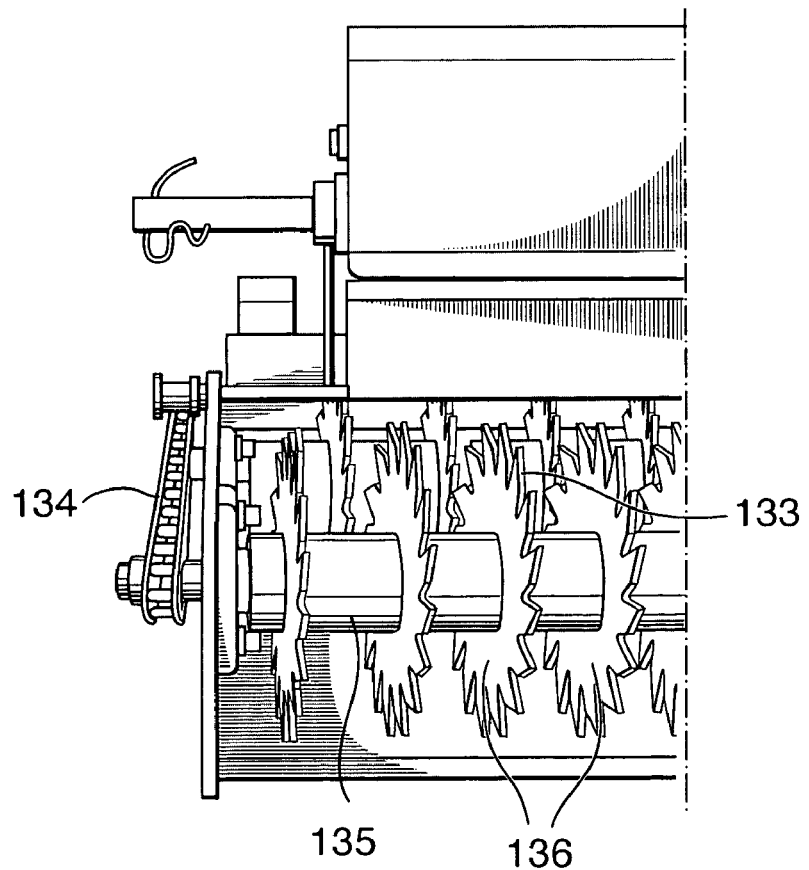
FIG. 4 is an oblique rear view of a portion of the implement shown in FIG. 1.
Figure 8:
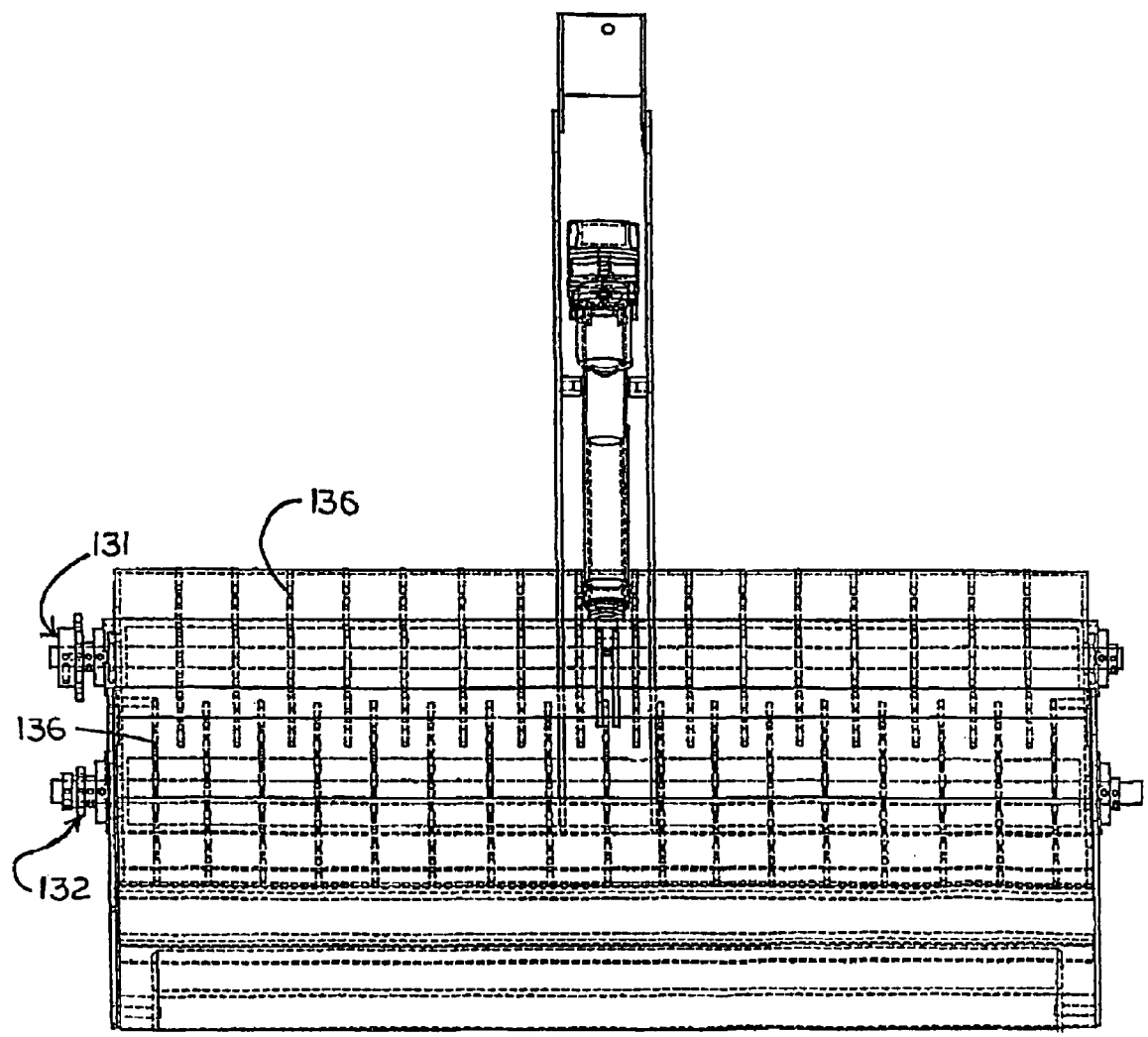
FIG. 8 is a top view showing the spacing and overlap of the blades of the aerator rollers and the rear depth control roller.

A hopper 170 is mounted to the top of the rigid frame, by way of mounting brackets 171, for discharging granular contents therein onto the ground behind the trailing aerator roller 132 and in front of the rear compactor roller. The brackets 171 maybe separate bracket members secured to the housing 110 and projecting upwardly therefrom or alternatively an extension of the housing end walls 111, 112 illustrated by way of example in FIGS. 1, 2. Means for controlling the flow of the seeds or granular material is incorporated into the hopper unit. One preferred embodiment uses a slotted plate 192 as shown in FIG. 7 which can be rotated laterally with respect to openings formed in the bottom of the hopper providing uniform distribution of seeds or granular material across the width of the aerator 10. An indicator means such as hash marks can be used to set the size of the openings to control the flow of material therethrough. Alternately, an adjustable sliding plate or bar 160 having a plurality of openings therein is in movable engagement with a plurality of openings 172 in the bottom 173 of the hopper for varying the size of the openings in order to determine the amount of material dispensing onto the ground such as seeds and/or granular contents, for example fertilizer, moss killer, weed killer or the like. Optionally, an agitator 174 is located within a bottom portion of the hopper to facilitate dispensing of the seeds, granular material etc. The agitator in one preferred embodiment is an elongate shaft that is nonuniform in outline cross-sectional shape and driven by the aerator roller 132 via sprockets and a link chain drive 175 as best shown in FIG. 3. The agitator and aerator roller 132 for example have a rotation ratio of 1:1 when the rotation ratio of aerator roller 132 to 131 is at a 1:3 ground speed. The speed of the agitator may be adjusted by changing the size of the drive gear. Moreover, the variable size outlet openings are commonly found in well known hand pulled garden seed and fertilizer spreaders and thus further description of the same is deemed unnecessary herein. The agitator shaft 174 is mounted on the end walls of the hopper by journals secured by bolt and nut units and suitably located slots are provided that permit adjusting the amount of slack in the drive chain 175.

The two ground engaging soil treatment aerator rollers, for reason of simplicity, are shown herein as being of the same construction but need not be the case if so desired. Functionally the two shown aerator rollers are distinguished one from the other by their respective speeds of rotation during use of the implement. One preferred rotation ratio of the front aerator roller 131 to the rear aerator roller 132 is (1:2). Other useful settings typically range from 1:4 to a range of (1 to 4) wherein the rear roller is rotating 4 times as fast as the front roller.

Each aerator roller 131, 132 has a central elongate hub 135 with a plurality of plates or blades 136 mounted thereon in spaced apart relation longitudinally there along with a spacing between two adjacent plates being about 3.5". The plates are welded to the hub and each plate or blade has a plurality of the teeth 133 projecting from the outer periphery thereof. The teeth 133 are spaced apart from one another circumferentially around the plate associated therewith and the teeth on one plate are circumferentially offset from those on the next adjacent plate. Each plate has an appearance of a saw blade with a diameter of for example about 8" and a thickness or kerf width that maybe selected as desired taking into account the intended function, soil penetration, wear considerations etc. Moreover, the tooth offset can be adjusted as well.

The aerator rollers 131, 132 are mounted at their respective opposite ends via bearings 117 on the housing end walls 111, 112. The bearings are secured by bolt and nut units with slots 118 in the plates 111, 112 (or bearing flanges) being provided for aerator roller 132. The slots are horizontal and thereby maybe used to adjust the spacing between the aerator rollers 131, 132 and/or change the amount of slack in the agitator drive chain 175.

The aerator rollers 131, 132 are spaced apart horizontally from one another with the spacing there-between being such that the plates on one aerator roller overlap the plates on the other aerator roller as best shown in FIGS. 4, 6, 8, and 9. The blades are spaced about 3.5 inches from one another resulting in a 1 and ¾ inch spacing at the overlap. The overlap blade spacing between the blades and between the rollers is particularly important when the implement is used on wet ground as a slightly wider overlap between rollers contributes to the aerator rollers being self-cleaning. The distance between blades needs to be closer and by way of example the overlap space between the front and rear blades maybe about 2.5 inches with the teeth being about 1.5 inches apart.

The depth adjustment system 150 includes an extendible and retractable hydraulic cylinder unit 152 connected at one end thereof to a lug 153 projecting from a shaft 154 that interconnects a spaced apart pair of arms 155, 156. In the fast hitch embodiment, these arms are pivotally connected intermediate their opposite ends to the respective end walls 111, 112 by pivot pins 155A and 156A. The other end of the unit 152 is anchored to the elongate rigid tow bar 113. The unit 152 is power operated by a hydraulic pump 156 drivingly connected to an electric motor 157 (powered by a battery on the implement or towing vehicle) and controlled via an operator actuated controller 159. The compaction aerator roller 151 is disposed between the trailing ends of the arms 155, 156 with the respective opposite ends connected thereto by suitable axle and journal means. Of course, it is contemplated that a lever arrangement could be used to manually adjust the arms and depth or that other means such as a screw jack, or ratchet can be used in place of the hydraulic unit 152 or the equivalent. As best shown in FIG. 6, depth adjustment indicator means 190 is provide whereby a series of hash marks or other indicia is disposed on the lever arm in proximity to the pivot point.

In the three point hitch embodiment as shown in FIGS. 5 and 6, a spaced apart pair of brackets 215, 216 connect to two points (linking arms) of a 3 point tractor hitch. The third hitch point connects to the bracket 212 secured to and projecting from the bar 154. Thus, the entire aerator 10 can be lifted off of the ground for transport. Moreover, the performance of the aerator rollers can be adjusted by lifting the front of the aerator with the tractor lift arms, lifting the rear of the aerator with the rear roller, or both.

Pivotal movement of the arms 155, 156 is restricted by respective ones of a pair of blocking members 230 mounted on the housing 110. These blocking members engage spaced apart stops 233, 234 on the arm (155, 156) associated therewith and also there is a pin 232 that projects into a slot 231.

The aerator implement conditions the ground surface as it is moved there over aerating the soil and distributing fertilizer and/or seeds thereon. The implement consists essentially of a pair of aerator rollers mounted on a frame that can be towed by a tractor or constructed so as to be self-propelled if so desired. The aerator rollers project below the frame for rolling engagement with the ground and are located one behind the other in tandem relation relative to the direction of travel of the implement during use thereof. Each aerator roller has a plurality of formations defining teeth that penetrate the ground surface. The formations on each aerator roller are spaced apart from one another circumferentially around and longitudinally along the roller associated therewith and such formations on one aerator roller are offset from those on the other roller permitting overlap of the same. The aerator rollers are interconnected in drive and driven relation to rotate in a predetermined ratio. A hopper mounted on the frame dispenses seeds, fertilizer or the like if so desired. A rear depth control roller assembly using one or more rolls 151 or wheels 161 is pivotally mounted on the frame and can be brought into rolling engagement with the ground to control the depth of penetration of the formations of the aerator rollers into the ground via an extendible and restartable hydraulic cylinder. Moreover, the depth control roller also functions as a compaction aerator roller. The performance of the rollers can be adjusted by lifting the front of the aerator with the tractor lift arms, lifting the rear of the aerator with the rear roller, or both.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

I claim:

1. An implement for conditioning the surface of the ground while being moved there-over, said implement comprising a rigid frame assembly having a pair of aerator rollers journalled thereon for rolling engagement with the ground surface, said pair of aerator rollers being located one behind the other in tandem relation relative to the direction of travel of the implement during use thereof, each said aerator roller having a plurality of formations that penetrate the ground surface, said formations being disposed in selected spaced apart relation circumferentially around and longitudinally along the aerator roller associated therewith, and drive means interconnecting said aerator rollers inter-relating rotation of the same in a predetermined ratio, said rigid frame including an aerator roller depth control means, said aerator roller depth control means comprising a pair of spaced apart pivot arms pivotally connected to said rigid frame supporting rolling means journalled thereon, and means for pivoting said arms and raising said frame and at least said rear aerators a selected height with respect to the ground whereby an upper end of each one of said pair of pivot arms connect to a longitudinal beam, said longitudinal beam pivotally connecting to a proximal end of an extendable/retractable longitudinal member, the distal end of said extendable/retractable longitudinal member being pivotally connected to said rigid frame whereby extending said extendable/retractable longitudinal member pivots said pair of pivot arms forcing said rolling means down and thereby raising said rigid frame and at least said rear aerator roller with respect to the ground.

2. The implement as defined in claim 1 wherein the spacing between the pair of aerator rollers is such that the formations on one aerator roller overlap the formations on the other aerator roller.

3. The implement as defined in claim 2 wherein at least one of said aerator rollers include a plurality of plate-like members defining aerator roller blades disposed in selected spaced apart relation and having a plurality of formations projecting from the outer periphery thereof.

4. The implement as defined in claim 3 wherein said formations comprise teeth.

5. The implement as defined in claim 4 wherein said blades have a leading edge that extends radially with respect the axis of rotation of the aerator roller associated therewith and a trailing edge disposed at a selected angle thereto.

6. The implement as defined in claim 1 wherein said trailing aerator roller rotates at a faster rate than said leading aerator roller.

7. The implement as defined in claim 1 including a seed dispensing hopper mounted on said rigid frame.

8. The implement as defined in claim 1 wherein said extendable/retractable longitudinal member is a hydraulic cylinder powered by a battery powered hydraulic motor.

9. The implement as defined in claim 1 wherein said rolling means comprise wheels.

10. The implement as defined in claim 1 wherein said rolling means comprises a trailing compaction roller.

11. The implement as defined in claim 3 wherein leading said aerator roller blades overlap trailing aerator roller blades and the adjacent leading said aerator roller blades and trailing said aerator roller blades are spaced apart a selected amount to encourage self cleaning of said aerator roller.

12. The implement of claim 3, wherein said aerator roller depth control means comprises a pair of spaced apart arms pivotally connected to said rigid frame supporting rolling means journalled thereon, and means for pivoting said arms and raising said frame and at least said rear aerator a selected height with respect to the ground.

13. The implement of claim 1 wherein at least one of said pivot arms include radial hash marks centered on a pivot point of said pivot arm in close proximity to a fixed point of reference on said rigid frame for measuring and setting said depth control.

14. The implement of claim 1, wherein said rigid frame includes a tongue extending from said rigid frame to the draw bar of a towing vehicle.

15. The implement of claim 1, wherein said rigid frame includes a 3-point lift assembly for connecting to a towing vehicle.

16. The implement of claim 12, including a depth adjustment system including an extendible and retractable hydraulic cylinder unit connected at one end thereof to a lug projecting from a shaft interconnecting a spaced apart pair of pivot arms pivotally connected intermediate their opposite ends to their respective end walls by pivot pins with the other end of the unit anchoring to an elongate rigid tow bar, said unit being power operated by a hydraulic pump drivingly connected to an electric motor powered by a battery on the implement or on a towing vehicle and controlled via an operator actuated controller.

17. The implement as defined in claim 1 wherein said extendable/retractable longitudinal member is a hydraulic cylinder powered by a battery powered hydraulic motor.

18. The implement as defined in claim 12 wherein said leading aerator roller blades overlap trailing said aerator roller blades by a selected amount and the adjacent leading said aerator roller blades and trailing said aerator roller blades are spaced apart a selected amount to cause said aerator rollers to be self cleaning.

19. An implement for conditioning the surface of the ground while being moved there-over, said implement consisting essentially of a rigid frame assembly having a pair of aerator rollers journalled thereon for rolling engagement with the ground surface, said pair of aerator rollers being located one behind the other in tandem relation relative to the direction of travel of the implement during use thereof, each said aerator roller having a plurality of formations that penetrate the ground surface, said formations being disposed in selected spaced apart relation circumferentially around and longitudinally along the aerator roller associated therewith, and drive means interconnecting said aerator rollers interrelating rotation of the same in a predetermined ratio, said rigid frame including an aerator roller depth control means comprising arms pivotally connected to said rigid frame with a trailing compaction roller journalled thereon, the upper ends of said arms connected by a longitudinal beam, said longitudinal beam pivotally connected to a proximal end of an extendable/retractable longitudinal member, the distal end of said extendable/retractable longitudinal member being pivotally connected to said rigid frame whereby extending said extendable/retractable longitudinal member pivots said arms forcing said trailing compaction roller up or down and thereby raising or lowering said rigid frame and said aerator rollers with respect to the ground.

20. The implement of claim 19, wherein the ratio of said leading aerator roller to said trailing aerator roller is 1:1.4 with said leading aerator roller rotating at a slower rate than trailing aerator roller.

\* \* \* \* \*